(12) United States Patent
Bouvier et al.

(10) Patent No.: US 8,639,862 B2
(45) Date of Patent: Jan. 28, 2014

(54) SYSTEM-ON-CHIP QUEUE STATUS POWER MANAGEMENT

(75) Inventors: Daniel L. Bouvier, Austin, TX (US); Satish Sathe, San Ramon, CA (US)

(73) Assignee: Applied Micro Circuits Corporation, Sunnyvale, CA (US)

(*) Notice: Subject to any disclaimer, the term of this patent is extended or adjusted under 35 U.S.C. 154(b) by 848 days.

(21) Appl. No.: 12/507,041

(22) Filed: Jul. 21, 2009

(65) Prior Publication Data

US 2011/0022871 A1 Jan. 27, 2011

(51) Int. Cl.
*G06F 11/30* (2006.01)
*G06F 3/00* (2006.01)
*G06F 1/26* (2006.01)
*G06F 1/28* (2006.01)
*G06F 1/32* (2006.01)

(52) U.S. Cl.
USPC ............ 710/52; 710/57; 713/300; 713/320; 713/322; 713/323; 713/340

(58) Field of Classification Search
None
See application file for complete search history.

(56) References Cited

U.S. PATENT DOCUMENTS

| | | | |
|---|---|---|---|
| 6,711,447 B1* | 3/2004 | Saeed | 700/82 |
| 7,539,124 B2* | 5/2009 | Rhim et al. | 370/208 |
| 7,610,497 B2* | 10/2009 | Lin et al. | 713/320 |
| 7,689,847 B2* | 3/2010 | Chang et al. | 713/322 |
| 2004/0071184 A1* | 4/2004 | Naveh et al. | 374/42 |
| 2009/0086737 A1* | 4/2009 | Fairhurst et al. | 370/394 |
| 2009/0328055 A1* | 12/2009 | Bose et al. | 718/105 |

FOREIGN PATENT DOCUMENTS

JP 2008-129846 * 6/2008 ............... G06F 1/32

* cited by examiner

*Primary Examiner* — Tanh Nguyen
(74) *Attorney, Agent, or Firm* — Turocy & Watson, LLP (57) ABSTRACT

A system and method are provided for using queue status to manage power in a system-on-chip (SoC). Messages to be processed are accepted in an SoC with a plurality of selectively enabled processors, and queued. The message traffic can be from an external source via an input/output (IO) interface, or intra-SoC messages between processors. The number of queued messages is monitored and, in response to the number of queued messages exceeding a subscription threshold, one or more processors are enabled. Then, the queued messages are distributed to the enabled processors. Enabling a processor is defined by an action such as supplying power to an unpowered processor, increasing the power supply voltage levels to a processor, increasing the operating frequency of a processor, or a combination of the above-mentioned actions. Likewise, processors can be disabled in response to the number of queued messages falling below the subscription threshold.

18 Claims, 4 Drawing Sheets

SYSTEM-ON-CHIP QUEUE STATUS POWER MANAGEMENT

BACKGROUND OF THE INVENTION

1. Field of the Invention

This invention generally relates to system-on-chip (SoC) power management and, more particularly, to a system and method for enabling processors in a multi-processor SoC by using a power management controller to monitor ingress and egress processor queue levels.

2. Description of the Related Art

Some conventional processors provide a mechanism for software (SW) to issue speed up or slow down commands to a programmable engine. Usually this mechanism is driven from a central power management SW driver associated with an operating system. Such mechanisms are based purely on the software and operating system view of workload demand. These mechanisms work well for computing applications whereby the operating system is charged with scheduling the processor resources and has complete control over what is executing when. However, for applications that are dominated by input/output (IO) processing, where the workload is dependent on a set of external events such as packet arrivals and departures, the operating system and associated device drivers do not have enough pre-knowledge of pending load status. Without such pre-knowledge, the processors must be kept in the fully "on" status in order to react to the worst case loading conditions.

Some existing systems make use of a micro-controller to manage device level power. As an example, the microcontroller may be primarily responsible for sequencing voltage, frequency, and even transistor bias in order to achieve a particular power performance mix. Commands to such a microcontroller are usually driven from a single device driver under an operating system. As described earlier, the commands are based on the software observed workload.

Dynamic voltage and frequency scaling (DVFS) permits processor frequency and voltage to be dynamically changed based on the software workload requirements. In some systems, DVFS is controlled by a dedicated side band interface between each software controlled processor and a central power management controller (PMC). Each processor typically has a dedicated set of control registers that it writes to change states. If the processor's OS wants a little bit more or less power, it writes to its corresponding control register using a device driver. In a multi core system using asymmetric multiprocessors there is no single unified device driver, but instead, a set of device drivers for each OS. These device drivers are unaware of each other.

In other prior art, a system level microcontroller may be responsible for system level power management. An example might be a notebook computer containing suspend states. The micro controller may be used to sequence the system back to normal operational state in the event of external stimulus such as an arriving wake up packet at an Ethernet port.

The problem with the above-mentioned systems is that none of them incorporate a means for making power management decisions based upon actual workload observation. None of these systems use a set of programmed thresholds that help the processing engine determines the optimal voltage and frequency calculation based on quality of service information. Further, for multiprocessing systems, the prior art is usually dependent on a single host-to-SW driver to manage power. Such schemes are not extensible to asymmetric multiprocessor systems. Even more so, they do not comprehend heterogeneous multiprocessor systems which may be comprised a mix of general purpose processors and accelerators.

Symmetric multiprocessing (SMP) is a system of computer architecture where two or more identical processors are connected to a single shared main (physical) memory. Further, each processor participating in the SMP system must coordinate together to manage memory. SMP systems permit any processor to work on any task, no matter where the data for that task is located in memory. SMP systems can move tasks between processors to balance the workload efficiently. Asymmetric multiprocessing (AMP) refers to a system whereby multiple processors independently run operating systems with no awareness of each other. In this case, there is no memory management coordination between the operating systems. Heterogeneous processors in this context are processors that have different programming models especially where memory management is concerned.

Examples of the prior art are found across the Intel and AMD x86 processor line. Microcontrollers for system power control are found in Apple and other notebooks. And last but not least, power management of multi core mobile appliances such as advanced mobile phone chip sets has existed for some time.

It would be advantageous if process power in a multi-processor system could be more efficiently managed using a means to directly measure the actual workload.

It would be advantageous if the actual workload could be measured by determining the number of messages in queue for processing.

SUMMARY OF THE INVENTION

Described herein is a mechanism to intelligently and dynamically manage system-on-chip (SoC) power consumption based upon pending IO load and associated software workload. A queue manager monitors the real-time loading in a system or multi core processor chip based on pre-set software configurable threshold levels. The threshold crossing information is passed to a power management controller, which in-turn adjusts its operating condition to match the performance requirements. The power management controller provides the capability to observe real-time loading in the system and adjusts the voltage and frequency of the device according to the load and a programmed behavior pattern. For a multi core processor, the power management controller can further be used to bring on-line additional processor resources as the load requires, and shut down processors as the load subsides. Thus, the overall energy consumed can be lowered to be directly and dynamically proportional to the workload.

This same power management controller (PMC) also provides a means for software power control mechanisms to indicate a preferred performance requirement and the thresholds for other observable loading. The programmable PMC collects all this information and determines the optimal processing required for the existing condition and adjusts the voltage and operating frequency accordingly. Because the queue manager has a view of what is to come for the processing elements, the PMC has ample time to raise and lower the performance level of the elements, eliminating the reactive nature associated with conventional power management schemes. This method allows dynamic scaling by looking at real-time operating conditions as well as a performance profile indicated by scheduled software routines. As a result, intelligent management decisions can be made by taking into account all existing information.

Accordingly, a method is provided for using queue status to manage power in a SoC. Messages to be processed are accepted in an SoC with a plurality of selectively enabled processors, and queued. The message traffic can be from an external source via an input/output (IO) interface, or intra-SoC messages between processors. The number of queued messages is monitored and, in response to the number of queued messages exceeding a subscription threshold, one or more processors are enabled. Then, the queued messages are distributed to the enabled processors. Enabling a processor is defined by an action such as supplying power to an unpowered processor, increasing the power supply voltage levels to a processor, increasing the operating frequency of a processor, or a combination of the above-mentioned actions. Likewise, processors can be disabled in response to the number of queued messages falling below the subscription threshold.

In an SoC including a plurality of selectively enabled asymmetric processors executing independent operating systems (OSs), a power management controller (PMC) hardware device may receive performance requirements from the OSs based upon scheduled software applications. Then, the PMC may enable processors in response to the received performance requirements, as well as queue monitoring.

In another aspect, processor temperature may be monitored, so that a processor can be disabled in response to its temperature exceeding a thermal threshold. Furthermore, feedback can be passed from the PMC back to the queue manager indicating that such a thermal excursion event has occurred. The queue manager can respond by limiting the number or priority type of messages sent to the disabled processor. In that case, the number of queued messaged distributed to a processor is decreased in response to it being disabled. In another aspect, processors can be disabled in response to a slack period time of day.

Additional details of the above-described method, and an SoC with a system for using queue status to manage power, are provided in more detail below.

DETAILED DESCRIPTION

Figure 1:
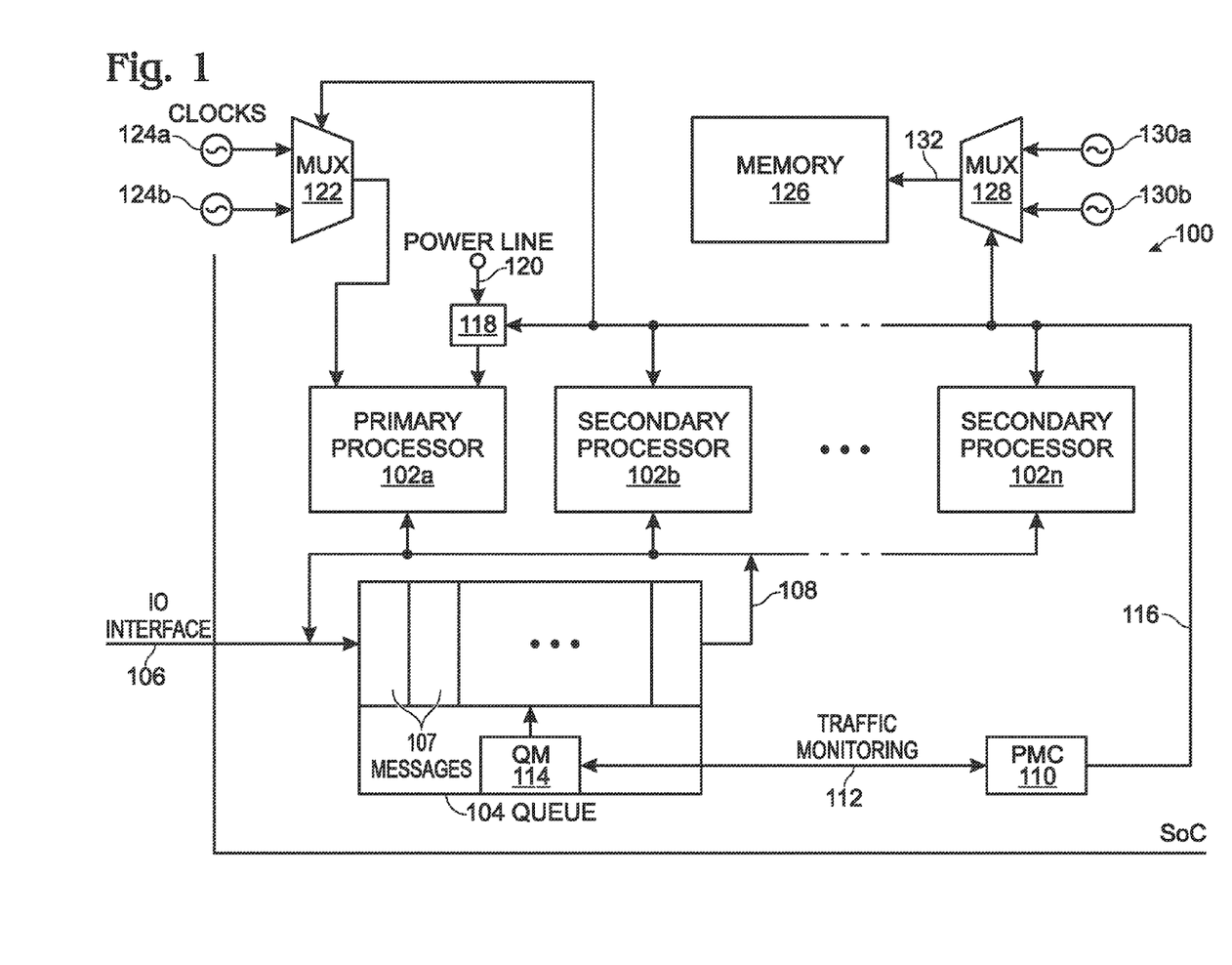
FIG. 1 is a schematic block diagram of a system-on-chip (SoC) with a system for using queue status to manage power.

FIG. 1 is a schematic block diagram of a system-on-chip (SoC) with a system for using queue status to manage power. The system 100 comprises a plurality of selectively enabled processors 102. Shown are processors 102a through 102n, where n is a variable not limited to any particular value. In this first aspect it is assumed that the processors 102 are homogeneous processors having the exact same functionality and programming model. That is, the processors can share the same operating system and application code (not shown).

A queue 104 has an input interface on line 106 for accepting and queuing the messages 107, and an output interface on line 108 for distributing messages to be processed. The queue 104 may accept message traffic from an external source via an input/output (IO) interface and intra-SoC messages between processors.

A power management controller (PMC) 110 has an interface on line 112 for monitoring the number of messages in the queue and receiving notification of current message traffic threshold crossings. In one aspect, line 112 is a state advertisement bus. More explicitly, the PMC 110 is connected to a queue manager (QM) 114, which monitors and controls queue operations. The PMC has an interface on line 116 to enable a processor (e.g., primary processor 102a) in response to the number of queued messages exceeding a subscription threshold. Further, the PMC 100 may enable a first plurality of processors in response to monitoring the queued messages exceeding a corresponding first plurality of subscription thresholds. For example, the PMC 110 may enable processor 102a in response to exceeding a first threshold and processor 102b in response to exceeding a second threshold. Alternately, the PMC 110 may enable the processor 102a to a first plurality of performance levels in response to monitoring queued messages exceeding a corresponding first plurality of subscription thresholds. For example, processor 102a may be turned on to a low-voltage or low-clock frequency state in response to the queued messages exceeding the first threshold, and enabled to a higher voltage or higher operating frequency in response to the queued messaged exceeding the second threshold.

If processor 102a is initially in an unpowered state, it is enabled if the PMC 110 supplies power, as represented by a control box 118 on dc power line 120. Alternately, the PMC 110 commands the processor 102a to "turn-on". Enabling a processor may also describe increasing the power supply voltage levels, increasing the operating frequency of a processor, and a combination of the above-mentioned actions. Shown is a multiplexer (MUX) 122 for selecting the processor clock 124 (e.g., a crystal or voltage controlled oscillator) supplied on line 122. Although the enablement mechanisms are only specifically shown for processor 102a, it should be understood that a plurality of processors in the system 100 may be enabled using similar control mechanisms.

Likewise, the PMC 110 may disable a processor (e.g., processor 102a) in response to the number of queued messages falling below the subscription threshold. As defined herein, disabling includes an action such as ceasing the supply of power to a processor, decreasing the power supply voltage levels to a processor, decreasing the operating frequency of a processor, or a combination of the above-mentioned actions.

In one aspect, the system 100 includes a memory 126 with a selectable operating frequency, interfaced to the PMC 110 on line 116. The PMC 110 may choose to increase the memory 126 operating frequency in response to the number of queued messages exceeding the subscription threshold. Shown is a MUX 128 for selecting the memory clock 130 (e.g., a crystal or voltage controlled oscillator) supplied on line 132.

Figure 2:
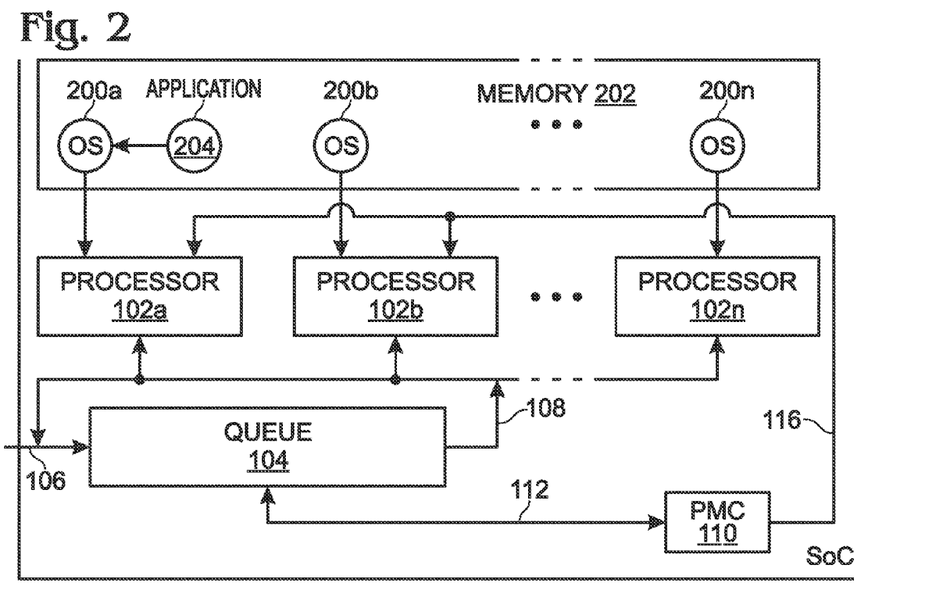
FIG. 2 is a schematic block diagram depicting a first variation of the system of FIG. 1.

FIG. 2 is a schematic block diagram depicting a first variation of the system of FIG. 1. A plurality of operating systems (OSs) 200 is shown, each enabled as processor executable instructions stored in a memory 202. In this aspect, the plurality of processors 102 include a plurality of selectively enabled asymmetric processors, each executing an independent OS. The term asymmetric means that the system is running multiple operating systems that are essentially unaware of each other, but sharing a common memory system. For simplicity, each processor 102a through 102n is assumed to be asymmetric. Each process is associated with its own OS 200, so that processor 102a is associated with OS 200a, processor 102b is associated with OS 200b, and processor 102n is associated with OS 200n. However, the system 100 may be comprised of both heterogeneous and homogenous processors.

For example, processor 102a and 102b may be a general purpose computer processing unit (CPU) and a data management application (DMA) engine, respectively. The CPU and the DMA engine have completely different memory management models. As another example, the processors may be an ARM processor and a PowerPC processor. There are a number of other processing devices existing that are well known by those with skill in the art, and the system 100 is not limited to any particular type of processor, microprocessor, or computing device. As used herein, a heterogeneous multi-processor system uses different types of processors—having different functionality and programming models. That is, heterogeneous processors use different algorithms to translate between virtual addresses and (real) addresses in a physical memory.

An OS is responsible for the management of software applications, the coordination of activities, and the sharing of computer resources. By using the OS as an interface to the hardware, an application is relieved of management details, making the applications easier to write. Applications access OS services through application programming interfaces (APIs) or system calls. By invoking these interfaces, the application can request a service from the operating system, pass parameters, and receive the results of the operation.

In this aspect, the PMC 110 receives performance requirements from the OSs 200 based upon scheduled software applications 204, and the PMC enables processors 102 in response to the received performance requirements.

Figure 3:
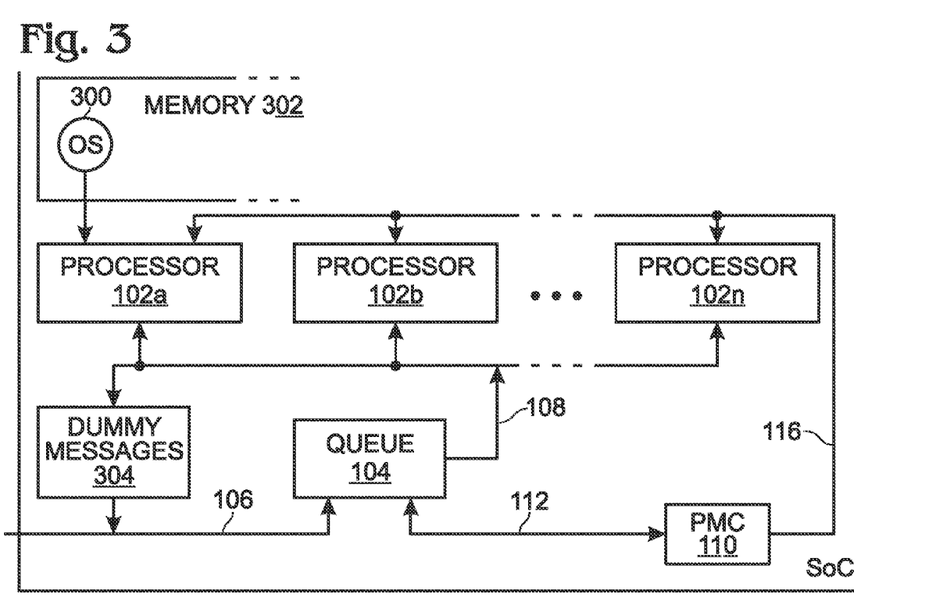
FIG. 3 is a schematic block diagram depicting a second variation of the system of FIG. 1.

FIG. 3 is a schematic block diagram depicting a second variation of the system of FIG. 1. In this aspect, an OS 300 is enabled as processor executable instructions stored in a memory 302. The OS manages a processor (e.g., processor 102a). Note: the other processors in the system may be homogeneous or asymmetric. If other processors are homogeneous, then OS 300 may also manage these homogeneous processors. The OS 300 posts self-addressed dummy messages 304 scheduled for enqueuing into queue 104 by the OS 300 at a guaranteed fixed interval. However, the messages are dequeued on line 108 at a non-fixed priority interval. In other words, the dequeuing of the dummy messages is dependent upon the total number of messages in the queue 104, and the priority of the other messages. The PMC 110 enables another processor (e.g., processor 102b) if the monitored queued dummy (and actual) messages exceed a subscription threshold.

That is, software posts dummy messages to itself at a certain fixed interval as determined by the OS scheduler. At the other side, the SW fetches the messages at an interval that is at a lower priority than other SW processes (tasks.) Therefore, if the dummy messages start to fall behind, this means that the processor is busy with other more important tasks and is not running fast enough, and processor performance needs to be increased.

Figure 4:
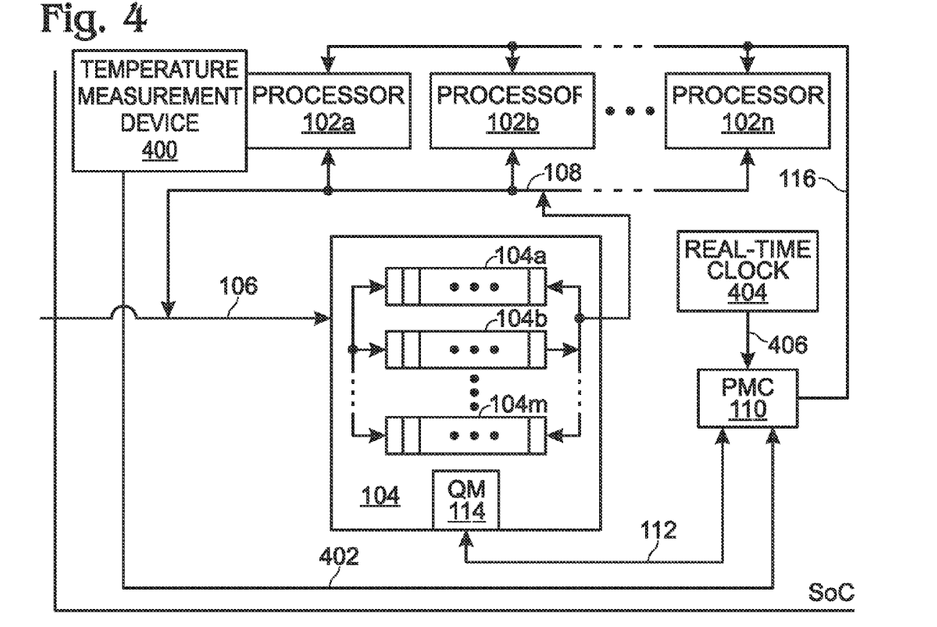
FIG. 4 is a schematic block diagram depicting a third variation of the system of FIG. 1.

FIG. 4 is a schematic block diagram depicting a third variation of the system of FIG. 1. In this aspect a first processor 102a temperature measurement device 400 is interfaced to the PMC 110 on line 402. The PMC 110 disables the first processor 102a in response to monitoring the first processor temperature exceeding a thermal threshold, and sends a first processor disablement message to the queue on line 112. The queue 104 (i.e. the QM 114) decreases the number of queued messaged distributed to the first processor 102a in response to the first processor disablement message. For example, more messages may be sent to processor 102b.

In a different aspect, the queue 104 includes a plurality of parallel queues 104a through 104m, where m is a variable not limited to any particular value. The queues are differentiated on the basis of message priority. The PMC 110 distributes messages to the first processor 102a from a high priority buffer (e.g., 104a), but not from a low priority buffer (e.g., 104m), in response to the first processor temperature exceeding a thermal threshold.

In another variation, a real-time clock 404 is interfaced to the PMC 110 on line 406. If the PMC is programmed with information regarding peak and non-peak usage times, the PMC 110 may disable, as defined above in the description of FIG. 1, a processor (e.g., 102a) in response to monitoring a slack period (non-peak use) time of day. The PMC 110 sends a first processor disablement message to the queue 104, and the queue decreases the number of queued messaged distributed to the first processor 102a in response to the first processor disablement message.

Figure 5:
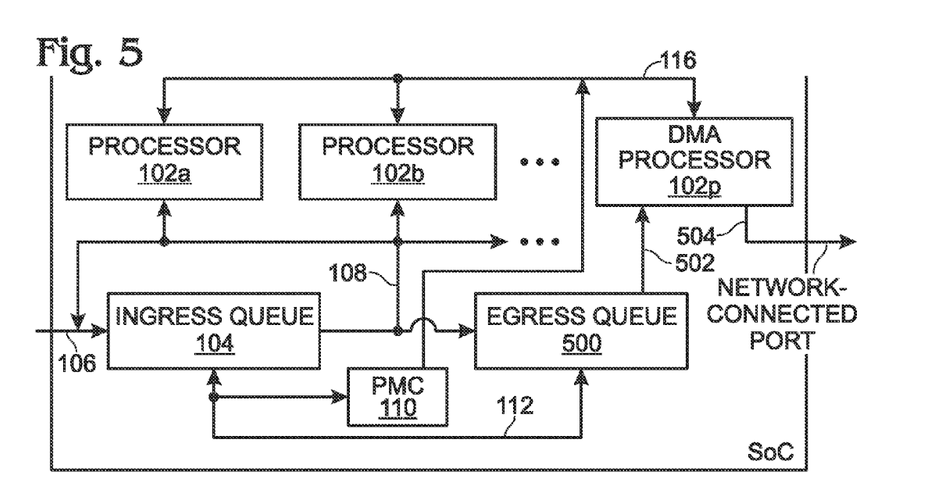
FIG. 5 is a schematic block diagram depicting a fourth variation of the system of FIG. 1.

FIG. 5 is a schematic block diagram depicting a fourth variation of the system of FIG. 1. An egress queue 500 has an input interface on line 108 to accept and queue messages from at least one processor, and an output interface on line 502. In this aspect, one of plurality of processors is a selectively enabled Ethernet port direct access memory (DMA) processor 102p having an interface connected to the egress queue output interface on line 502, a network-connected port on line 504, and an interface to the PMC on line 116. The PMC 110 monitors the number of queued messages in the egress queue 500 and enables the DMA processor 102p in response to the number of queued messages exceeding a subscription threshold. Then, the DMA processor 102p drains the egress queue 500 and transmits the messages via the network-connected port 504 in response to being enabled.

There may be one or more egress queues associated with the network controller. When no traffic is posted for egress the interface logic can be placed in a low power state. When messages are posted for egress, the PMC recognizes this and powers up the controller 102p so that it can begin transmitting the data.

Functional Description

Modem multi core highly integrated processors used for communications and IO processing are designed to handle a highly varying subscription level. A subscription level in this case is defined as the amount of IO traffic (such as packets per second) that the processor must process at any point in time. As overall energy consumption becomes more of a critical factor in system design, it is desirable to have a mechanism that can intelligently adjust the processing resources as the workload increases and decreases over time.

Prior solutions have been primarily focused on managing power from software's view point of the pending work. But in the case of IO processing, software does not necessarily have the central view of the system workload. Further, in the case of a heterogeneous asymmetric device, conventional host-based control of power management is not capable of fully exploiting power management.

A second issue with conventional software driven solutions is that they are reactive and not proactive. In other words, the software increases the processing resources only after it recognizes that it is falling behind. The problem with this approach is that the response time to increase resources is much too slow for a real-time deadline based computing subsystem. Therefore, such power management schemes either are used in a very coarse way or not at all.

As noted above, software driver power management systems cannot accurately determine the actual pending workload, and there is a latency in the time needed by the software to determine that more processing power is required. Another problem is when the software itself starts to schedule more activity based on the number or complexity of the applications that are executing. So in this case the OS must put a request out to turn up the voltage and frequency. This is done by sending a message to the PMC. In a symmetric processing system it is likely that one power management driver would be responsible for all power management needs of every core. However, in an asymmetric multiprocessor there are 2 or more OSs executing across the CPU cores. Each can run an independent power management driver unaware of what the other drivers are doing. Thus, each can send power management messages to the PMC requesting that the system resources be changed based on those requests. It is possible that these requests may contradict each other.

Conventionally, processors make use of software managed communications mechanisms for handshaking between processors and peripherals. Such mechanisms usually have descriptors and use circular queues with a head and tail pointer where the producer "owns" the head pointer and the consumer owns the tail pointer. In such mechanisms there is no means to view actual pending processing traffic. Therefore, no intelligence can be applied to speed up or slow down the compute resources.

The systems described in FIGS. 1-5 make use of a central hardware managed message passing and queuing mechanism, such as a queue manager, and a programmable microcontroller or programmable set of state logic. The microcontroller or state logic is referred to herein as the power management controller (PMC.)

Intra-chip communications is based on transfer of control messages from a producer to a consumer. Such control messages are transferred through a set of hardware managed queues. In this case the head and tail pointers for the queues are owned and managed by centralized hardware. Therefore, the hardware has a view of the subscription level of each and every queue (how many message elements are pending for the consumer).

The PMC monitors all queues that are serviced by a certain block and determines whether that block should be slowed down or sped up. In addition, the PMC monitors the performance profile provided by software. This profile indicates the thresholds against which queue structures should be compared while making dynamic voltage and frequency adjustments. Specifically, the software can indicate three things:

1. The processing performance required for that process;
2. The other blocks in the design that are utilized in this process; and,
3. The thresholds against which the existing values will be compared.

In some circumstances parallel processing is possible, whereby rather than a single consumer of a queue, multiple processing elements can potentially process the same queue. Such resources are therefore scheduled and messages distributed based on a scheduling algorithm. The PMC is responsible for turning on and off processing resources as the workload warrants, and informing the scheduling logic when such resources are available or not.

For example, consider a multi core processor with some number of processors assigned to doing some form of packet processing. Packets arrive into the device are classified, and messages related to each packet are placed into a work queue. This work queue is assigned to a group of n processors. Consider that no messages are pending processing and all n processors are in a low power managed state such as running at a low frequency and lower voltage, or completely disabled with power removed. When one packet arrives and a message is enqueued to the processor bank, the PMC is notified. It proceeds to enable the first CPU core and inform the scheduler that the message may be transferred to it. As further packets arrive and messages are enqueued, a queuing threshold is reached, whereby the PMC must now bring online additional processing resources. As the pending messages are serviced and the queue fill begins to subside, processors can be taken offline by the PMC.

The mechanism described is not only relevant to traffic as it enters the device but can be directly applied as traffic moves between different processing resources within the device.

As another aspect of the invention, the PMC may also have an interface to device level thermal sensing. Upon reaching certain thermal threshold levels, the PMC may be programmed to reduce processing capabilities and, thus, the overall device level throughput in an attempt to correct the thermal excursion. Such information can also be communicated back to the queue manager to delay or suspend processing of certain queues based on QoS information that software has preconfigured. Thus, a crippled state can be accomplished providing critical traffic processing resources, but suspending all non-important traffic. When temperature returns to acceptable limits the PMC senses such and returns the queue manager to its nominal scheduling state.

As noted in FIG. 1, the PMC can be made responsible for more than just the CPU performance. It might also raise and lower the memory system performance based on the load. For example, it might change the Cache or DRAM bus frequencies based on current load and anticipated load/store demands.

Figure 6:
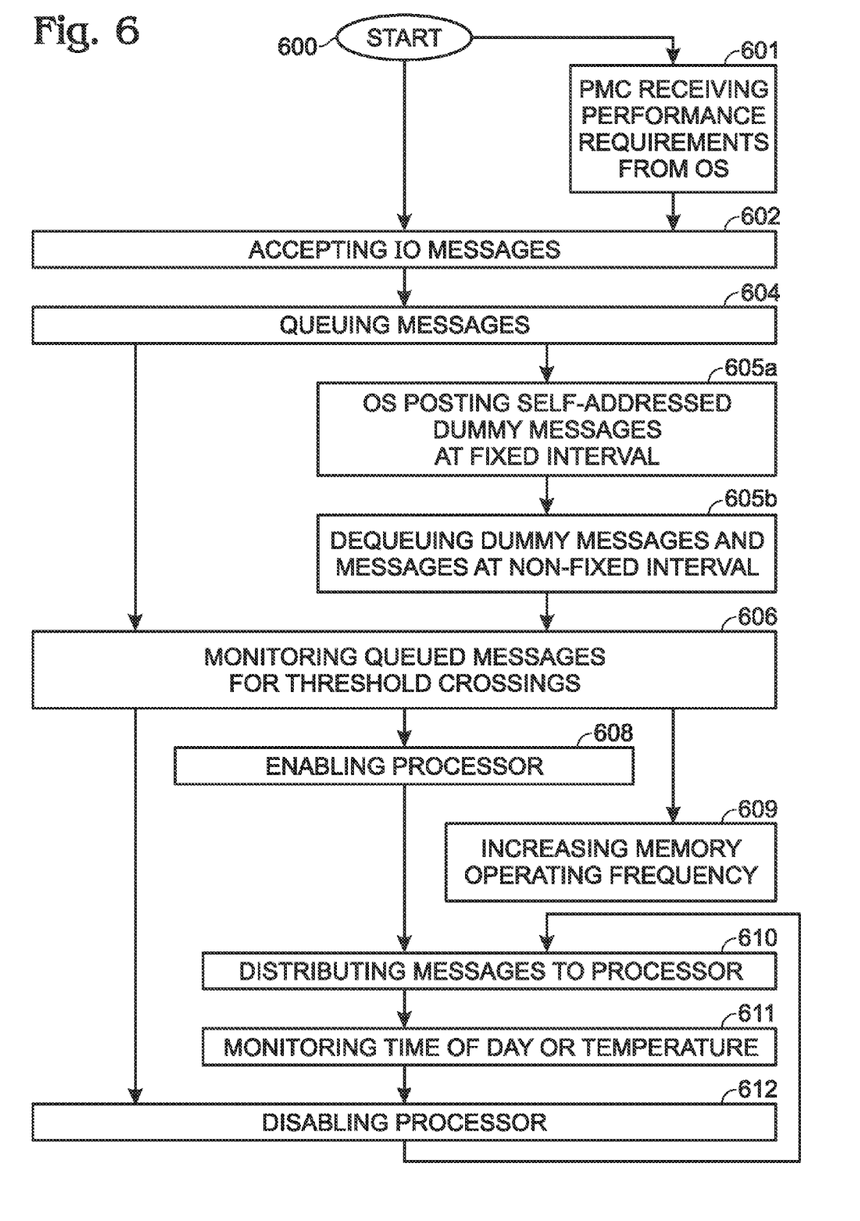
FIG. 6 is a flowchart illustrating a method for using queue status to manage power in a SoC.

FIG. 6 is a flowchart illustrating a method for using queue status to manage power in a SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

In an SoC with a plurality of selectively enabled processors, Step 602 accepts messages to be processed. Step 602 may accept message traffic from an external source messages via an input/output (IO) interface or intra-SoC messages between processors. Step 604 queues the messages. Step 606 monitors the number of queued messages. Alternately stated, Step 606 monitors queued messages for subscription threshold crossings. In response to the number of queued messages exceeding a subscription threshold, Step 608 enables a first processor. The first processor is enabled with an action such as supplying power to an unpowered processor, increasing the power supply voltage levels to a processor, increasing the operating frequency of a processor, or a combination of the above-mentioned actions. Step 610 distributes queued messages to the enabled first processor.

In one aspect, enabling the first processor in Step 608 includes enabling a first plurality of processors in response to exceeding a corresponding first plurality of subscription thresholds. In another aspect, Step 608 includes enabling the first processor to a plurality of performance levels in response to monitoring queued messages exceeding a corresponding first plurality of subscription thresholds.

Step 612 disables the first processor in response to the number of queued messages falling below the subscription threshold. Disabling is defined as ceasing the supply of power to a processor, decreasing the power supply voltage levels to a processor, decreasing the operating frequency of a processor, or a combination of the above-mentioned actions.

In one aspect, the SoC includes a plurality of selectively enabled asymmetric processors executing independent OSs. In Step 601 the PMC hardware device receives performance requirements from the OSs based upon scheduled software applications. Then, monitoring queued messages (Step 606) and enabling the first processor (Step 608) includes the PMC enabling the first processor in response to the received performance requirements.

In another aspect, an OS managing a second processor posts self-addressed dummy messages in Step 605a, scheduled for enqueuing by the OS at a guaranteed fixed interval. The OS dequeues the dummy messages (with the messages accepted in Step 602) at a non-fixed first priority interval in Step 605b. The monitoring queued messages (Step 606) and enabling the first processor (step 608) includes a PMC enabling the first processor in response to the monitored queued dummy (and actual) messages exceeding a subscription threshold.

In one aspect, Step 611 monitors a characteristic such as the temperature of the first processor or a slack period time of day. Step 612 disables the first processor in response to the first processor temperature exceeding a thermal threshold, or in response to the time of day. Then, distributing queued messages to the first processor in Step 610 includes decreasing the number of queued messaged distributed to the first processor in response to the first processor being disabled.

In another aspect, queuing the messages in Step 604 includes queuing the messages in parallel buffers differentiated on the basis of message priority. Then, decreasing the number of queued messages distributed to the first processor in response to the first processor temperature exceeding a thermal threshold (Step 610) includes distributing messages to the first processor from a high priority buffer, but not distributing messages from a low priority buffer.

In one variation, the SoC includes a memory with a selectable operating frequency. Then, in response to the number of queued messages exceeding the subscription threshold, Step 609 increases the memory operating frequency.

In another variation the SoC includes a selectively enabled Ethernet port direct access memory (DMA) processor for transmitting messages. Then, Step 604 queues the messages in an egress queue, and Step 606 monitors the number of queued messages in the egress queue. In response to the number of queued messages exceeding a subscription threshold, Step 608 enables the DMA processor, and in Step 610 the DMA processor drains the egress queue and transmits the messages.

A system and method have been provided for managing cache memory in a computer system. Examples of particular message structures, processor, and hardware units have been presented to illustrate the invention. However, the invention is not limited to merely these examples. Other variations and embodiments of the invention will occur to those skilled in the art.

We claim:

1. A method for using queue status to manage power in a system-on-chip (SoC), the method comprising:
   accepting messages to be processed;
   queuing the messages;
   monitoring the number of queued messages;
   receiving one or more performance requirements and one or more self-addressed messages from at least one operating system executed by a plurality of selectively enabled processors; and
   enabling a first processor in response to the number of queued messages and the one or more self-addressed messages exceeding a subscription threshold and based at least in part on the one or more performance requirements.

2. The method of claim 1 wherein enabling the first processor comprises supplying power to the first processor in an unpowered state, increasing the power supply voltage levels to the first processor, increasing the operating frequency of the first processor, or a combination of the above-mentioned actions.

3. The method of claim 1 wherein accepting messages to be processed comprises accepting messages from a source comprised of external source messages accepted via an input/output (IO) interface or a source comprised of intra-SoC messages between processors.

4. The method of claim 1 wherein a first plurality of processors is enabled in response to the number of queued messages and the one or more self-addressed messages exceeding a corresponding first plurality of subscription thresholds.

5. The method of claim 1 further comprising:
   disabling the first processor in response to the number of queued messages and the one or more self-addressed messages falling below the subscription threshold, wherein disabling the first processor comprises ceasing the supply of power to the first processor, decreasing the power supply voltage levels to the first processor, decreasing the operating frequency of the first processor, and a combination of the above-mentioned actions.

6. The method of claim 1 wherein the SoC comprises a memory with a selectable operating frequency; and,
   the method further comprising:
   in response to the number of queued messages and the one or more self-addressed messages exceeding the subscription threshold, increasing the memory operating frequency.

7. The method of claim 1 wherein enabling the first processor in response to the number of queued messages and the one or more self-addressed messages exceeding a subscription threshold comprises enabling the first processor to a plurality of performance levels in response to the number of queued messages and the one or more self-addressed messages exceeding a corresponding first plurality of subscription thresholds.

8. A system-on-chip (SoC) with a system for using queue status to manage power, the system comprising:
   a plurality of selectively enabled processors;
   a queue having an input interface for accepting and queuing messages, and an output interface for distributing messages to be processed; and
   a power management controller (PMC) having an interface for monitoring the number of messages in the queue, and an interface to enable a first processor in response to the number of queued messages and one or more self-addressed messages exceeding a subscription threshold and based at least in part on one or more performance requirements from at least one operating system executed by the plurality of selectively enabled processors, wherein the one or more self-addressed messages are received from the at least one operating system executed by the plurality of selectively enabled processors.

9. The system of claim 8 wherein the PMC enables the first processor by supplying power to the first processor in an unpowered state, increasing the power supply voltage levels to the first processor, increasing the operating frequency of the first processor, or a combination of the above-mentioned actions.

10. The system of claim 8 wherein the queue accepts messages from a source comprised of external source messages accepted via an input/output (IO) interface or a source comprised of intra-SoC messages between processors.

11. The system of claim 8 wherein the PMC enables a first plurality of processors in response to the number of queued messages and the one or more self-addressed messages exceeding a corresponding first plurality of subscription thresholds.

12. The system of claim 8 wherein the PMC disables the first processor in response to the number of queued messages and the one or more self-addressed messages falling below the subscription threshold, wherein disabling the first processor comprises ceasing the supply of power to the first processor, decreasing the power supply voltage levels to the first processor, decreasing the operating frequency of the first processor, or a combination of the above-mentioned actions.

13. The system of claim 8 further comprising:
a memory with a selectable operating frequency, interfaced to the PMC; and,
wherein the PMC increases the memory operating frequency in response to the number of queued messages and the one or more self-addressed messages exceeding the subscription threshold.

14. The system of claim 8 wherein the PMC enables the first processor to a first plurality of performance levels in response to the number of queued messages and the one or more self-addressed messages exceeding a corresponding first plurality of subscription thresholds.

15. The method of claim 1 further comprising:
distributing queued messages to the enabled first processor.

16. The system of claim 8 wherein the queue distributes queued messages to the enabled first processor.

17. A system, comprising:
a plurality of selectively enabled processors;
a queue having an input interface for accepting and queuing messages, and an output interface for distributing messages to be processed; and
a power management controller (PMC) having an interface for monitoring the number of messages in the queue, and an interface to enable a first processor in response to the number of queued messages and one or more self-addressed messages exceeding a subscription threshold and based at least in part on one or more performance requirements from at least one operating system executed by the plurality of selectively enabled processors,
wherein the PMC enables the first processor by supplying power to the first processor in an unpowered state, increasing the power supply voltage levels to the first processor, increasing the operating frequency of the first processor, or a combination of the above-mentioned actions, and wherein the one or more self-addressed messages are received from the at least one operating system executed by the plurality of selectively enabled processors.

18. The system of claim 17 wherein the queue distributes queued messages to the enabled first processor.

* * * * *